(12) United States Patent
Maki

(10) Patent No.: US 10,661,378 B2
(45) Date of Patent: May 26, 2020

(54) METHOD FOR MANUFACTURING SPARK PLUG

(71) Applicant: NGK SPARK PLUG CO., LTD., Nagoya-shi, Aichi (JP)

(72) Inventor: Shunsuke Maki, Komaki (JP)

(73) Assignee: NGK SPARK PLUG CO., LTD., Nagoya-Shi, Aichi (JP)

( * ) Notice: Subject to any disclaimer, the term of this patent is extended or adjusted under 35 U.S.C. 154(b) by 264 days.

(21) Appl. No.: 15/715,598

(22) Filed: Sep. 26, 2017

(65) Prior Publication Data

US 2018/0161913 A1 Jun. 14, 2018

(30) Foreign Application Priority Data

Dec. 12, 2016 (JP) .................. 2016-240173

(51) Int. Cl.
| | |
|---|---|
| *B23K 11/30* | (2006.01) |
| *H01T 21/02* | (2006.01) |
| *H01T 13/39* | (2006.01) |
| *B23K 11/00* | (2006.01) |
| *B23K 11/31* | (2006.01) |

(Continued)

(52) U.S. Cl.
CPC ........ *B23K 11/3009* (2013.01); *B23K 11/002* (2013.01); *B23K 11/31* (2013.01); *H01T 13/32* (2013.01); *H01T 13/39* (2013.01); *H01T 21/02* (2013.01); *B23K 2101/36* (2018.08)

(58) Field of Classification Search
CPC ... B23K 11/002; B23K 11/3009; B23K 11/31; B23K 2101/36; B23K 11/115; B23K 11/0033; B23K 2201/36; H01T 13/32; H01T 13/39; H01T 21/02

USPC .............................................. 219/91.2, 117.1
See application file for complete search history.

(56) References Cited

U.S. PATENT DOCUMENTS

| | | | | |
|---|---|---|---|---|
| 6,659,826 | B2 * | 12/2003 | Hanai | ................ B23K 11/0046 |
| | | | | 219/86.24 |
| 2009/0322198 | A1 * | 12/2009 | Kameda | .................. H01T 13/39 |
| | | | | 313/141 |

(Continued)

FOREIGN PATENT DOCUMENTS

| | | |
|---|---|---|
| JP | S61-195520 | 8/1986 |
| JP | S61-195520 A | 8/1986 |

(Continued)

OTHER PUBLICATIONS

Office Action received in corresponding Japanese Patent Application No. 2016-240173, dated Sep. 13, 2018 (English translation provided).

(Continued)

*Primary Examiner* — Ibrahime A Abraham
*Assistant Examiner* — Biniam B Asmelash
(74) *Attorney, Agent, or Firm* — Kusner & Jaffe

(57) ABSTRACT

Disclosed is a method for manufacturing a spark plug of the type in which a tip is joined to a ground electrode. In a positioning step, the ground electrode is positioned with respect to a first electrode by means of a pressing member. In a tip pressing step, the tip is pressed against a tip weld site of the ground electrode by means of a second electrode. In a welding step, the tip is resistance welded to the tip weld site of the ground electrode by the passage of electric current between the first and second electrodes.

3 Claims, 7 Drawing Sheets

(51) Int. Cl.
*H01T 13/32* (2006.01)
*B23K 101/36* (2006.01)

(56) References Cited

U.S. PATENT DOCUMENTS

| | | | |
|---|---|---|---|
| 2013/0225029 A1* | 8/2013 | Kyuno | .................... H01T 21/02 |
| | | | 445/7 |
| 2013/0280980 A1 | 10/2013 | Tanaka et al. | |
| 2017/0141546 A1 | 5/2017 | Fujii | |

FOREIGN PATENT DOCUMENTS

| | | | | |
|---|---|---|---|---|
| JP | 2006-185784 (A) | 7/2006 | ............. | H01T 13/20 |
| JP | 2016-009652 A | 1/2016 | | |

OTHER PUBLICATIONS

European Examination Report, dated Mar. 20 2019, issued in connection with European Patent Application No. 17 204 775.5.

\* cited by examiner

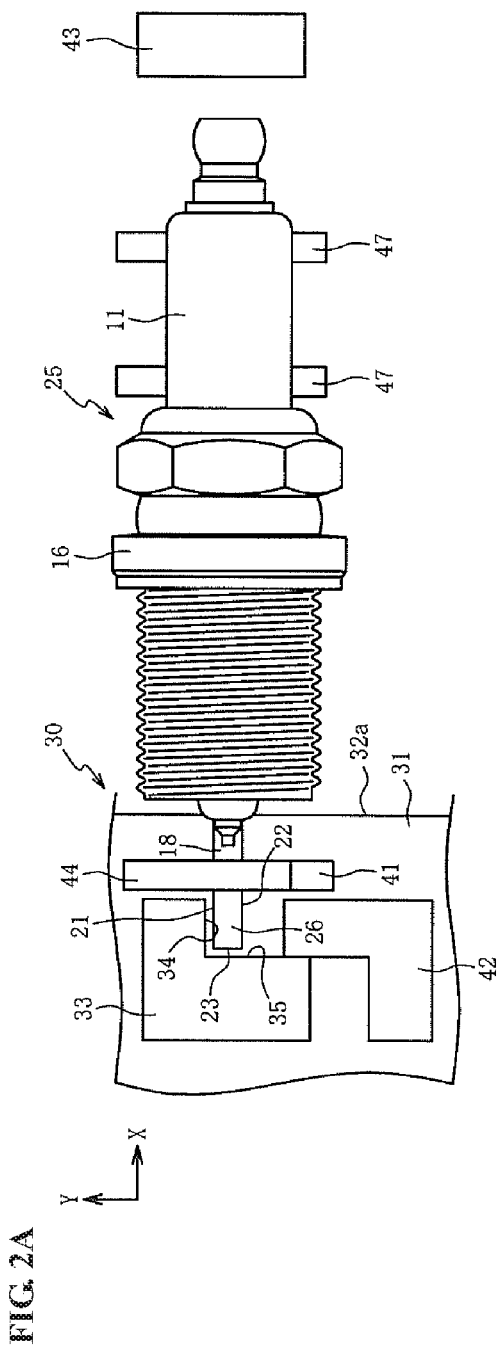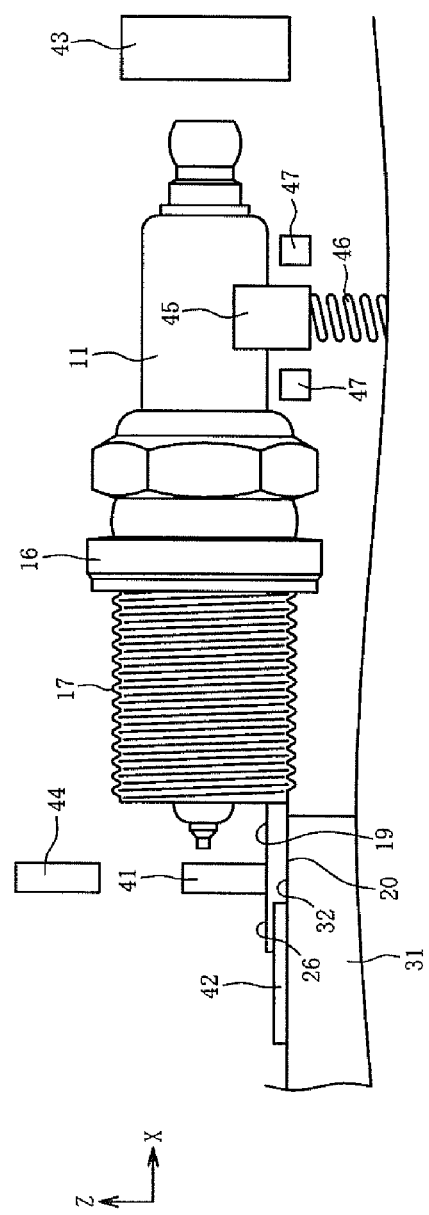

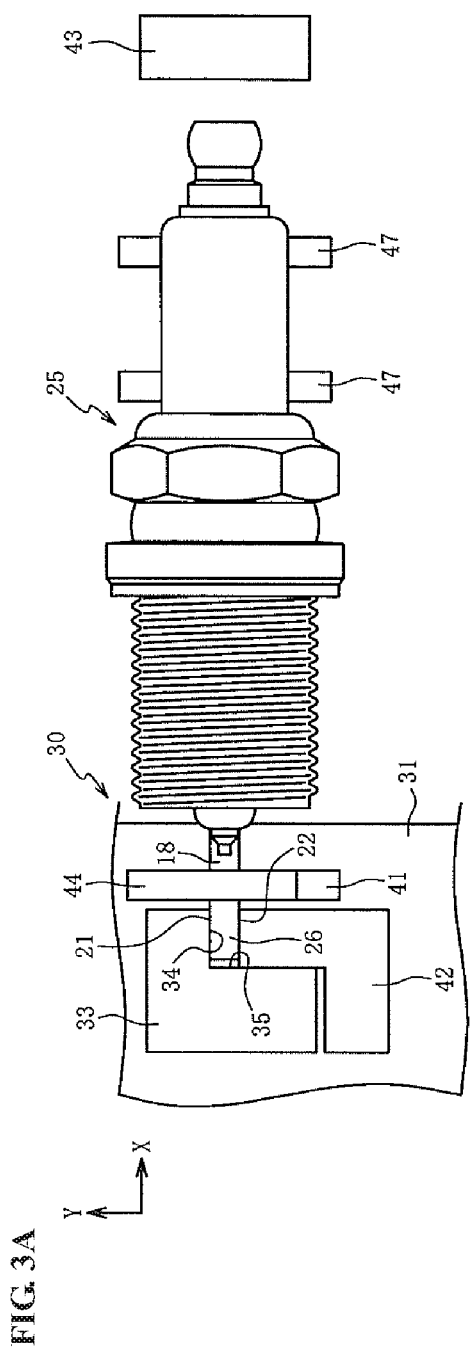
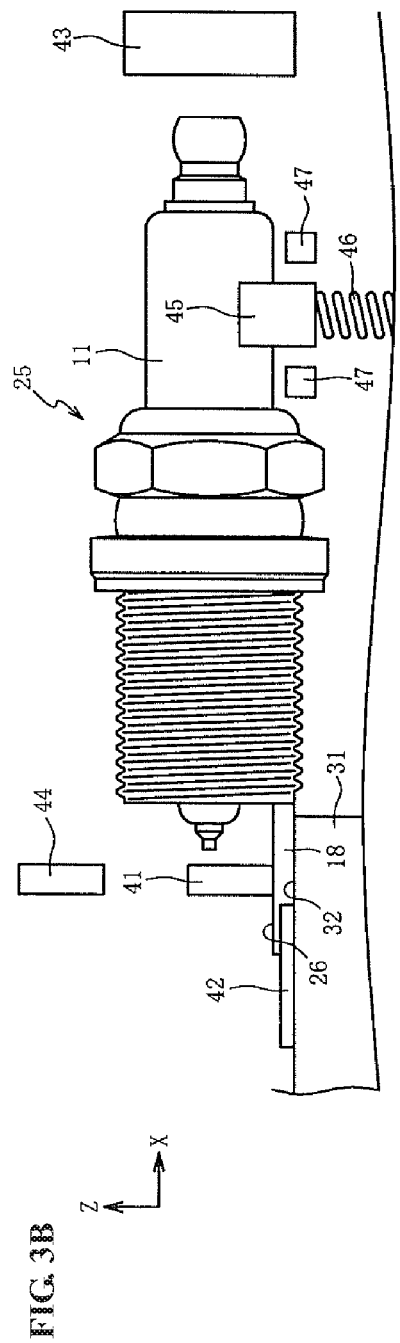

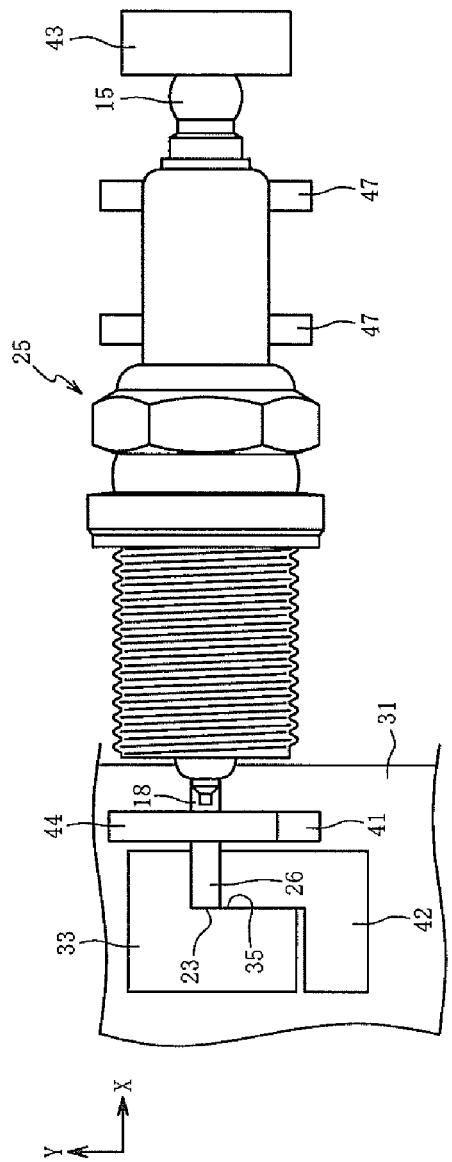
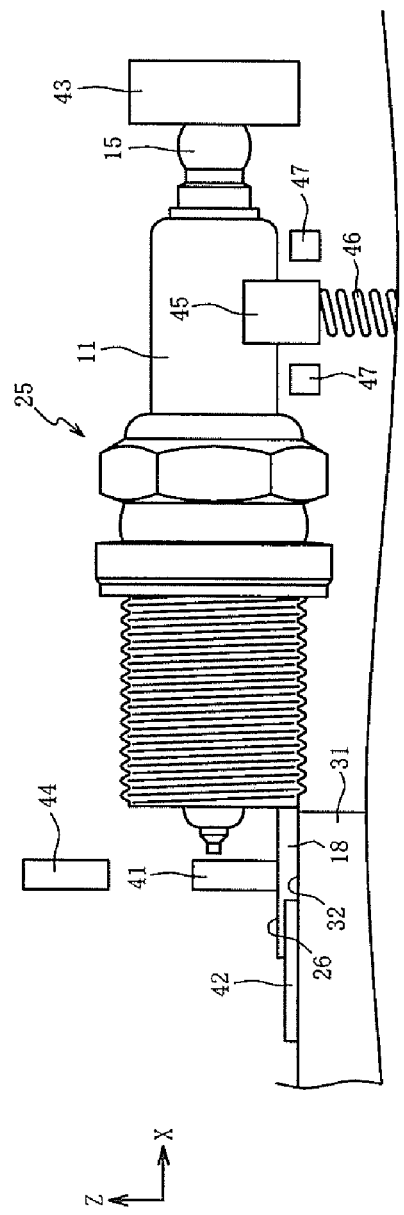
FIG. 4A
FIG. 4B

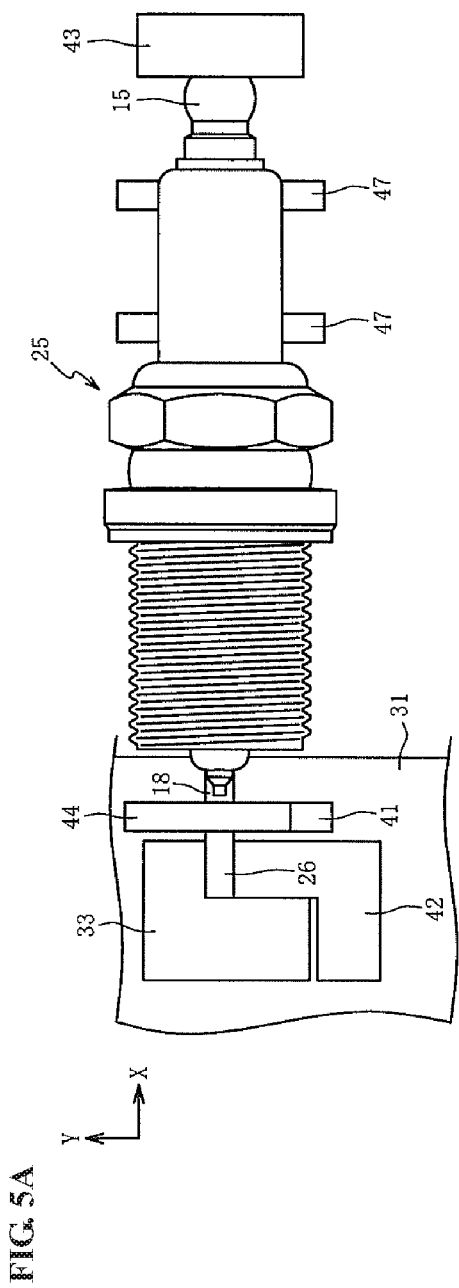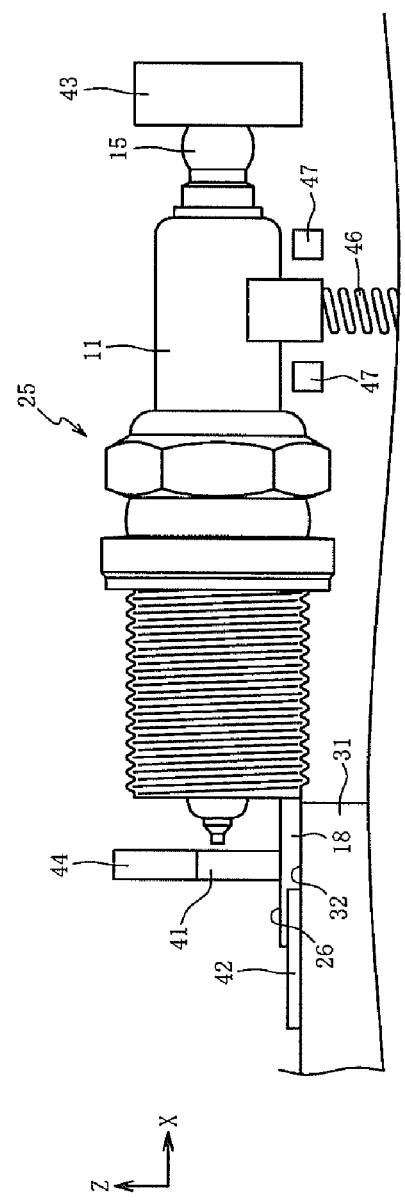

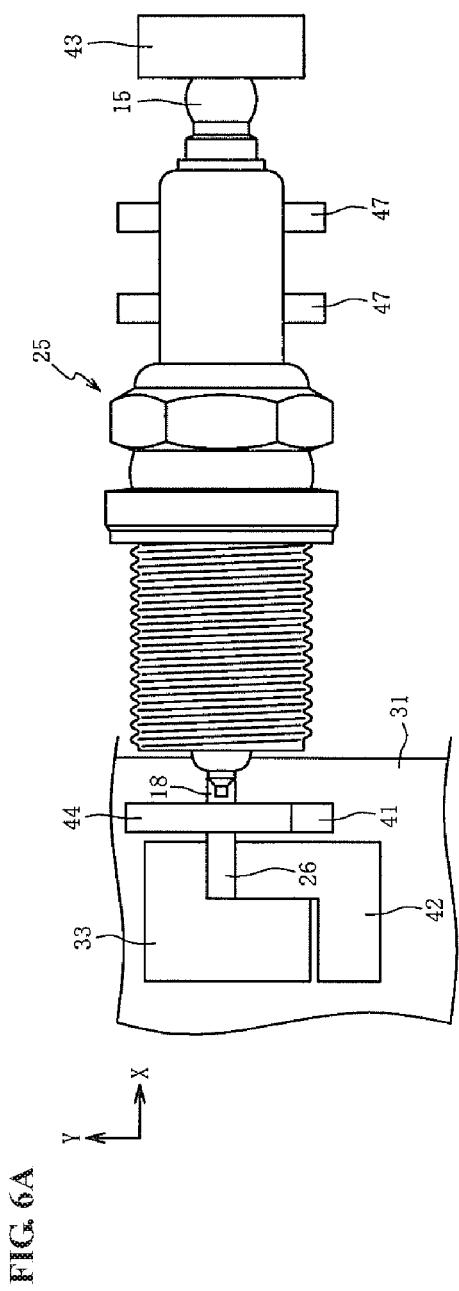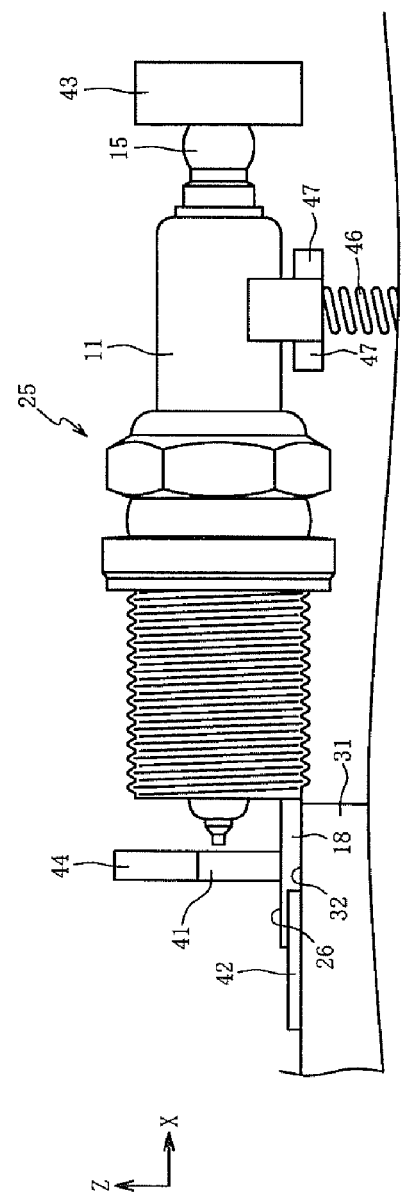

METHOD FOR MANUFACTURING SPARK PLUG

RELATED APPLICATION

This application claims the benefit of Japanese Patent Application No. 2016-240173, filed Dec. 12, 2016, the entire contents of which are incorporated herein by reference.

FIELD OF THE INVENTION

The present invention relates to a method for manufacturing a spark plug, particularly of the type in which a tip is joined by resistance welding to a ground electrode.

BACKGROUND OF THE INVENTION

A spark plug is conventionally known, in which a tip is joined to a ground electrode. Japanese Laid-Open Patent Publication No. 2006-185784 discloses a technique of manufacturing this type of spark plug by laser welding the tip to the ground electrode after positioning the ground electrode.

However, the above conventional technique has no contrivance for resistance welding of the tip to the ground electrode.

SUMMARY OF THE INVENTION

It is an advantage of the present invention to provide a method for manufacturing a spark plug by resistance welding a tip to a ground electrode with improved positioning accuracy.

In accordance with a first aspect of the present invention, there is provided a method for manufacturing a spark plug, the spark plug comprising: an insulator holding therein a center electrode; a metal shell surrounding a part of the insulator; a ground electrode joined to the metal shell, the ground electrode having an inner surface facing the center electrode and an outer surface located opposite the inner surface; and a tip welded to a tip weld site on the inner surface of the ground electrode, the method comprising:

a positioning step of positioning the ground electrode with respect to a first electrode by bringing the outer surface of the ground electrode into contact with the first electrode and bringing a pressing member into contact with a part of the ground electrode other than the tip weld site;

a tip pressing step of allowing a second electrode to press the tip against the tip weld site of the ground electrode; and a welding step of resistance welding the tip to the tip weld site of the ground electrode by the passage of electric current between the first and second electrodes.

This method is characterized in that, in a state where the ground electrode is positioned with respect to the first electrode by means of the pressing member, the tip is pressed against the ground electrode by means of the second electrode and then resistance welded to the ground electrode by the passage of electric current between the first and second electrodes. It is therefore possible to improve the positioning accuracy of the tip with respect to the ground electrode.

In accordance with a second aspect of the present invention, there is provided a method for manufacturing a spark plug as described above, wherein, in the positioning step, the pressing member presses the ground electrode in the same direction as a direction in which the second electrode presses the tip in the tip pressing step.

In this case, it is possible to suppress variations in the contact resistance between the first electrode and the ground electrode and thereby possible to suppress variations in the joint strength of the tip to the ground electrode.

In accordance with a third aspect of the present invention, there is provided a method for manufacturing a spark plug as described above, wherein a surface of the first electrode for contact with the outer surface of the ground electrode is larger in area than the outer surface of the ground electrode.

It is also possible in this case to suppress variations in the contact resistance between the first electrode and the ground electrode and thereby possible to suppress variations in the joint strength of the tip to the ground electrode.

In accordance with a fourth aspect of the present invention, there is provided a method for manufacturing a spark plug as described above, wherein the method further comprises, before the welding step, a supporting step of supporting the insulator by applying a force to the insulator in the same direction as a force exerted on the ground electrode by the first electrode.

In this case, it is possible to more effectively suppress variations in the contact resistance between the first electrode and the ground electrode and prevent or minimize variations in the joint strength of the tip to the ground electrode.

The other advantages and features of the present invention will also become understood from the following description.

BRIEF DESCRIPTION OF DRAWINGS

FIGS. 2A and 2B are an elevation view and a side view of a welding device used for joining of the tip to the ground electrode according to one embodiment of the present invention.

FIGS. 3A and 3B are an elevation view and a side view of the welding device during a positioning step according to one embodiment of the present invention.

FIGS. 4A and 4B are an elevation view and a side view of the welding device during the positioning step according to one embodiment of the present invention.

FIGS. 5A and 5B are an elevation view and a side view of the welding device during the positioning step according to one embodiment of the present invention.

FIGS. 6A and 6B are an elevation view and a side view of the welding device during the positioning step according to one embodiment of the present invention.

DETAILED DESCRIPTION OF THE PREFERRED EMBODIMENTS

Hereinafter, one exemplary embodiment of the present invention will be described below with reference to the drawings.

Figure 1:
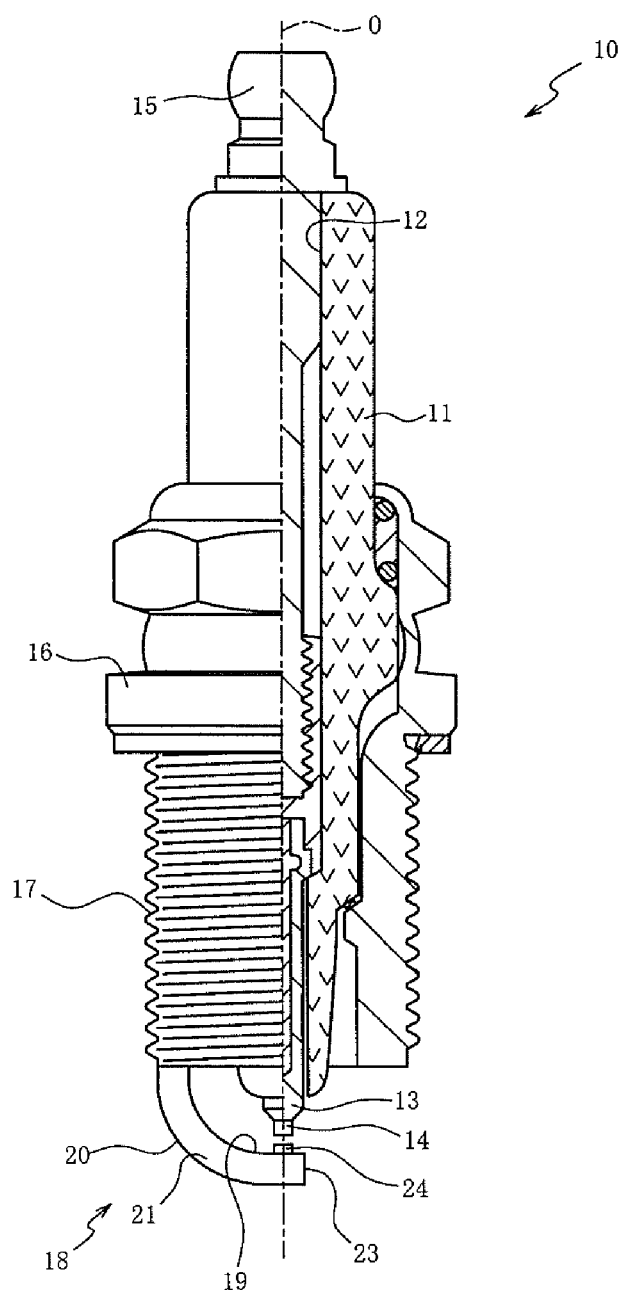
FIG. 1 is a schematic view, partially in section, of a spark plug with a tip joined to a ground electrode according to one embodiment of the present invention.

FIG. 1 is a schematic view, partially in section, of a spark plug 10 according to one exemplary embodiment of the present invention. In the following description, the bottom and top sides of FIG. 1 are referred to as front and rear sides of the spark plug 10, respectively.

As shown in FIG. 1, the spark plug 10 includes an insulator 11, a metal shell 16 and a ground electrode 18.

The insulator 11 is made of e.g. alumina, which has excellent mechanical properties and high-temperature insulating properties, in a cylindrical shape with an axial hole 12 formed therethrough along an axis O.

A center electrode 13 is formed in a rod shape so as to extend along the axis O. In the present embodiment, the center electrode 13 has a core made of copper or a copper-based alloy and a coating layer made of nickel or a nickel-based alloy. The center electrode 13 is held in a front end side of the axial hole 12 with a front end of the center electrode 13 being exposed from the axial hole 12. A noble metal-containing tip 14 is joined to the front end of the center electrode 13.

A metal terminal 15 is made of a conductive metal material (such as low carbon steel) in a rod shape and press-fitted in a rear end side of the axial hole 12 with a rear end portion of the metal terminal 15 being exposed from the axial hole 12 for connection with a high-voltage cable (not shown).

The metal shell 16 is made of a conductive metal material (such as low carbon steel) in a substantially cylindrical shape. The metal shell 16 is fixed by crimping onto a front end part of the outer circumference of the insulator 11 such that the insulator 11 is held in the metal shell 16 and such that the rear end portion of the metal terminal 15 is kept apart from the metal shell 16 in the direction of the axis O. A thread portion 17 is formed on an outer circumferential surface of the metal shell 16 so as to be screwed into a screw hole of an engine (not shown).

The ground electrode 18 is made of a metal material (such as nickel-based alloy) and joined at a base end face thereof by welding to a front end of the metal shell 16. In the present embodiment, the ground electrode 18 is rectangular in cross section and bent at a middle portion thereof such that a distal end portion of the ground electrode 18 is opposed to the front end of the center electrode 13 (tip 14). More specifically, the ground electrode 18 has: an inner surface 19 facing the center electrode 13; an outer surface (back surface) 20 located opposite the inner surface 19; first and second side surfaces 21 and 22 (also see FIG. 2A) connecting the inner surface 19 to the outer surface 20; and a distal end face 23 located opposite the base end face. A noble metal-containing tip 24 is joined by welding to a region of the inner surface 19 of the ground electrode 18 located adjacent to the distal end face 23. The region of the inner surface 19 to which the tip 24 is welded is hereinafter referred to as a "tip weld site 26 (see e.g. FIGS. 2A and 2B)".

There is defined a spark gap between the tip 24 on the ground electrode 18 and the tip 14 on the center electrode 13.

The above-structured spark plug 10 can be manufactured by the following procedure. After the tip 14 is joined to the front end of the center electrode 13, the center electrode 13 is inserted in the axial hole 12 of the insulator 11 such that the front end of the center electrode 13 (tip 14) is exposed outside from the axial hole 12. The metal terminal 15 is then inserted in the axial hole 12 of the insulator 11 and electrically connected to the center electrode 3. After the ground electrode 18 (in a straight unbent form) is joined at the base end face thereof to the metal shell 16, the metal shell 16 is fixed to the outer circumference of the insulator 11. Thus provided is a plug work 25 in which the insulator 11, the center electrode 13 with the tip 14, the metal terminal 15, the metal shell 16 and the ground electrode 18 are assembled together. The tip 24 is joined to the inner surface 19 of the ground electrode 18 of the plug work 25. Finally, the ground electrode 18 is bent such that the tip 24 is opposed to the center electrode 13 (tip 14).

Next, a method for joining the tip 24 to the ground electrode 18 will be explained below.

FIGS. 2A and 2B are an elevation view and a side view of a welding device 30 used for joining of the tip 24 to the ground electrode 18. The welding device 30 is configured to hold the ground electrode 18 of the plug work 25 in position and join the tip 24 to the ground electrode 18 by resistance welding (also see FIG. 1). For illustration purposes, mutually perpendicular X, Y and Z directions of the welding device 30 are represented by arrows X, Y and Z in FIGS. 2A and 2B.

Figure 7:
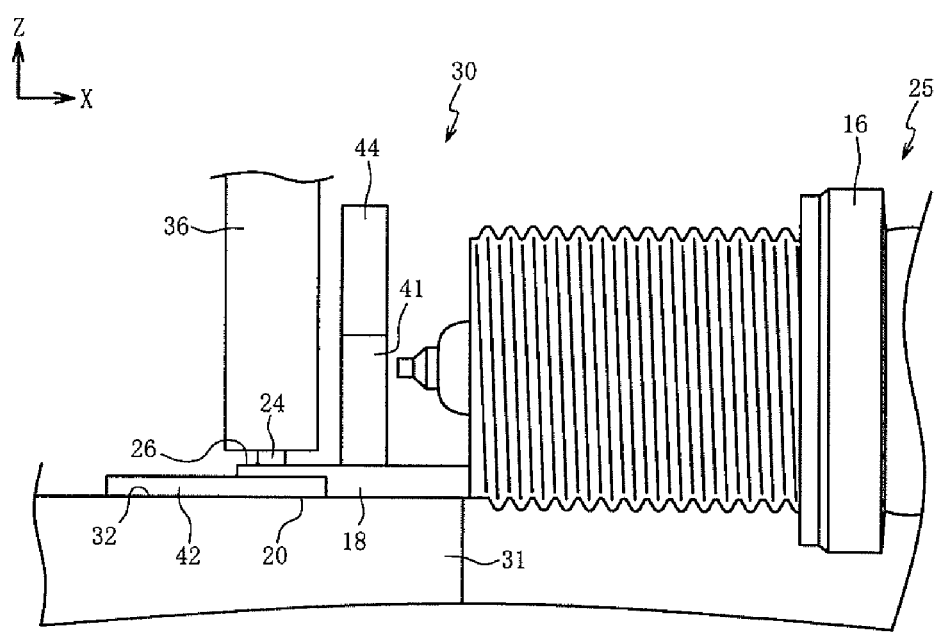
FIG. 7 is a side view of the welding device during a tip pressing step and a welding step according to one embodiment of the present invention.

As shown in FIGS. 2A and 2B, the welding device 30 includes a first electrode 31 formed with a flat surface 32, a reference member 33 formed with first and second surfaces 34 and 35, first to fourth pressing parts 41 to 44 as a pressing member, a support member 45 and a second electrode 36 (see FIG. 7).

As mentioned above, the plug work 25 to which the tip 24 is to be welded by the welding device 30 is obtained by joining the ground electrode 18 to the metal shell 16 and fixing the insulator 11 in the metal shell 16. In the plug work 25, the ground electrode 18 is in a state of extending in a straight form before bending.

The first and second electrodes 31 and 36 are used to weld the tip 24 to the tip weld site 26 of the ground electrode 18 by the passage of electric current. The flat surface 32 of the first electrode 31 serves as a reference plane for positioning of the ground electrode 18 in the Z direction. In the present embodiment, the flat surface 32 of the first electrode 31 is made larger in area than the outer surface 20 of the ground electrode 18.

The reference member 33 is fixed in position to the flat surface 32 of the first electrode 31 and used to restrict the position of the ground electrode 18 on the flat surface 32 of the first electrode 31. Since the length and width of the ground electrode 18 can be varied depending on the type of the spark plug 10, the welding device 30 includes a mechanism (not shown) for adjusting the position of the reference member 33 on the flat surface 32 according to the length and width of the ground electrode 18 and fixing the reference member 33 to the flat surface 32. The first surface 34 of the reference member 33 intersects the flat surface 32 of the first electrode 31 and serves as a reference plane for positioning of the ground electrode 18 on the flat surface 32 in the Y direction. The second surface 35 of the reference member 33 perpendicularly intersects the flat surface 32 and the first surface 34 via corners and serves as a reference plane for positioning of the ground electrode 18 on the flat surface 32 in the X direction.

The plug work 25 is placed in the welding device 30 such that the axis O of the plug work 25 is aligned in the X direction of the welding device 30. The position of an edge 32a of the flat surface 32 of the first electrode 31 is adjusted so as to, when the ground electrode 18 of the plug work 25 is arranged on the first electrode 31 along the first and second surfaces 34 and 35 of the reference member 33, allow substantially the entire outer surface 20 of the ground electrode 18 to make contact with the flat surface 32 while keeping the metal shell 16 of the plug work 25 free from contact with the flat surface 32. This ensures contact of substantially the entire outer surface 20 of the ground electrode 18 with the flat surface 32 of the first electrode 31 irrespective of the thread portion 17 on the outer circumferential surface of the metal shell 16.

The first to fourth pressing parts 41 to 44 are used as the pressing member to press the plug work 25 onto the first electrode 31 and the reference member 33 and hold the ground electrode 18 of the plug work 25 in position with respect to the first electrode 31. Each of the first to fourth pressing parts 41 to 44 is intermittently driven in a reciprocating manner by an actuator such as pneumatic cylinder (not shown).

The first pressing part 41 is disposed at a position opposed to the flat surface 32 of the first electrode 31 and is driven by the actuator in the Z direction to be moved closer to or away from the flat surface 32. As seen in FIG. 2A, the first pressing part 41 is located between the edge 32a of the flat surface 32 and the reference member 33 in the X direction and, even when moved closer to the flat surface 32, does not interfere with the reference member 33.

The second pressing part 42 is slidably disposed on the flat surface 32 of the first electrode 31, at a position opposed to the first surface 34 of the reference member 33, and is driven by the actuator in the Y direction to be moved closer to or away from the first surface 34. As seen in FIG. 2B (Y-direction side view), the second pressing part 42 is located farther apart from the edge 32a than the first pressing part 41. Further, the second pressing part 42 does not interfere with the second surface 35 of the reference member 33 and the first pressing part 41 even when moved closer to the first surface 34 as seen in FIG. 2A.

The third pressing part 43 is disposed in substantially the same plane as an imaginary plane extending in the X direction from the flat surface 32 of the first electrode 31, at a position apart from the first electrode 31 and opposed to the second surface 35 of the reference member 33, and is driven by the actuator in the X direction to be moved closer to or away from the second surface 35.

In the present embodiment, a thickness of each of the second pressing part 42 and the reference member 33 (i.e. a Z-direction dimension from the flat surface 32 of the first electrode 31) is made smaller than a thickness of the ground electrode 18 (i.e. a distance between the inner surface 19 and the outer surface 20). This prevents interference of the second electrode 36 (by which the tip 24 is pressed against the ground electrode 18) with the second pressing part 42 and the reference member 33 during the after-mentioned tip pressing and welding steps (see FIG. 7).

The fourth pressing part 44 is disposed at a position opposed to the flat surface 32 of the first electrode 31, while overlapping a portion of the first pressing part 41 in the Z direction, and is driven by the actuator in the Z direction to be moved closer to or away from the flat surface 32. The fourth pressing part 44, when moved closer to flat surface 32, interferes with the first pressing part 41.

The support member 45 is arranged at a position apart from the first electrode 31 in the X direction and between the first electrode 31 and the third pressing part 43. The support member 45 is elastically supported by a spring 46. In the present embodiment, a compression coil spring is provided as the spring 46 to apply an elastic force to the support member 45 in the Z direction. When the plug work 25 is placed in the welding device 30 with alignment of the axis O of the plug work 25 and the X direction of the welding device 30, the support member 45 interferes with and supports the insulator 11 of the plug work 25 so as to allow intimate contact between the outer surface 20 of the ground electrode 18 and the flat surface 32 of the first electrode 31.

A pair of restriction members 47 are arranged to hold the support member 45 therebetween and restrict elastic vibration of the support member 45 caused by the spring 46. More specifically, the restriction members 47 are disposed on both sides of the support member 45 at positions apart from the support member 45 in the X direction perpendicular to the direction of vibration of the support member 45 (Z direction). The restriction members 47 are driven by an actuator as pneumatic cylinder (not shown) and moved closer to or away from the support member 45.

In the present embodiment, the tip 24 is joined to the ground electrode 18 by the welding device 30 through the following positioning step, supporting step, tip pressing step and welding step.

FIGS. 3A, 4A, 5A and 6A are elevation views of the welding device 30 during the positioning step; and FIGS. 3B, 4A, 5B and 6A are side views of the welding device 30 during the positioning step. FIG. 7 is a side view of the welding device 30 during the tip pressing and welding steps.

In the positioning step, the plug work 25 is placed in the welding device 30 such that the axis O of the plug work 25 is aligned with the X direction of the welding device 30 as shown in FIGS. 2A and 2B. In the welding device 30, the ground electrode 18 of the plug work 25 is situated between the reference member 33 and the second pressing part 42 with the first side surface 21 of the ground electrode 18 being opposed to the first surface 34 of the reference member 33 and with the distal end face 23 of the ground electrode 18 being opposed to the second surface 35 of the reference member 33.

First, the first pressing part 41 is driven by the actuator in the direction closer to the flat surface 32 of the first electrode 31 and brought into contact with any region of the inner surface 19 of the ground electrode 18 other than the tip weld site 26 (e.g. a region of the inner surface 19 between the tip weld site 26 and the metal shell 16) so as to press the outer surface 20 of the ground electrode 18 against the flat surface 32 of the first electrode 31. The thrust of the actuator for driving the first pressing part 41 is controlled in such a manner that the ground electrode 18 is pressed against the first electrode 31 with a relatively small force by the first pressing part 41. By this, the ground electrode 18 is temporarily fixed to the first electrode 31.

In the supporting step, the insulator 11 of the plug work 25 is supported by the support member 45 under the elastic force of the spring 46. In the present embodiment, the spring 46 applies its elastic force to the support member 45 in the same direction as the direction of the force exerted on the ground electrode 18 by the first electrode 31 being pressed by the first pressing part 41. Namely, the plug work 25 is supported at both end sides thereof by the first electrode 31, the first pressing part 41 and the support member 45. The load of the first pressing part 41 for pressing the ground electrode 18 against the first electrode 13 can be thus reduced as compared with the case where the plug work 25 is supported in a cantilever state by the first electrode 31 and the first pressing part 41. Furthermore, the bending load exerted on the ground electrode 18 under the own weight of the plug work 25 can be suppressed to prevent deformation of the ground electrode 18.

Next, the second pressing part 42 is driven by the actuator in the direction closer to the first surface 34 of the reference electrode 33 and brought into contact with the second side surface 22 of the ground electrode 18 as shown in FIGS. 3A and 3B in the positioning step. The thrust of the actuator for driving the second pressing part 42 is controlled in such a manner that the ground electrode 18 is slid over the flat surface 32 toward the first surface 34 against the frictional force caused due to pressing of the ground electrode 18 against the first electrode 31 by the first pressing part 41. The ground electrode 18 is accordingly held between the first surface 34 and the second pressing part 42 and positioned in the Y-direction with respect to the first electrode 31.

As the insulator 11 of the plug work 25 is supported by the support member 45, the load of the first pressing part 41 for pressing the ground electrode 18 against the first electrode 31 is reduced to decrease the frictional force caused due to pressing of the ground electrode 18 against the first electrode 31 by the first pressing part 41. The thrust of the actuator for driving the second pressing part 42 is hence prevented from becoming excessively high.

The third pressing part 43 is driven by the actuator in the direction closer to the second surface 35 of the reference electrode 33 and brought into contact to the metal terminal 15 of the plug work 25 in the positioning step as shown in FIGS. 4A and 4B. The thrust of the actuator for driving the third pressing part 43 is controlled in such a manner that the ground electrode 18 is slid over the flat surface 32 toward the second surface 35 against the frictional force caused due to pressing of the ground electrode 18 against the first electrode 31 by the first pressing part 41 and against the frictional force caused due to pressing of the ground electrode 18 against the reference member 33 by the second pressing part 42. The plug work 25 is accordingly held between the second surface 35 and the third pressing part 43 so that the ground electrode 18 is positioned in the X direction with respect to the first electrode 31.

As mentioned above, the support member 45 (which is brought into contact with the insulator 11 of the plug work 25) is supported by the spring 46. By causing elastic deformation of the spring 46 in the X direction, the support member 45 is prevented by X-direction elastic deformation of the spring 46 from interfering with X-direction movement of the plug work 25 by the third pressing part 43. Even in the case where corrugation is formed on the outer circumferential surface of the insulator 11, the spring 46 can be elastically deformed to follow the peak-to-valley shape of the corrugation so as to prevent the support member 45 from interfering with X-direction movement of the plug work 25.

The fourth pressing part 44 is then driven by the actuator in the direction closer to the flat surface 32 of the first electrode 31 and brought into contact with the first pressing part 41 as shown in FIGS. 5A and 5B in the positioning step. The fourth pressing part 44 applies a load to the first pressing part 41 such that the ground electrode 18, which has been pressed against the first electrode 31 by the first pressing part 41, is further pressed against the first electrode 31. The ground electrode 18 is fixed under the loads of the first and fourth pressing parts 41 and 44. The positioning of the ground electrode 18 with respect to the first electrode 31 is hereby completed.

Subsequently, the support member 45 is held between the restriction members 47 so as to restrict elastic vibration of the support member 45 as shown in FIGS. 6A and 6B. In this state, the plug work 25 is prevented from vibrating in the Z direction such that the Z-direction angle of the plug work 25 relative to the flat surface 32 of the first electrode 31 is not varied.

In the tip pressing step, the tip 24 is arranged on the tip weld site 26 of the inner surface 19 of the ground electrode 18 as shown in FIG. 7. The welding device 30 is set depending on the length, width and thickness of the ground electrode 18 in such a manner that the tip 24 is arranged at a predetermined distance away from the first and second surfaces 34 and 35 of the reference member 33 in the X and Y directions (see FIG. 2A) and at a predetermined distance away from the flat surface 32 of the first electrode 31 in the Z direction. The tip 24 is pressed onto the tip weld site 26 of the ground electrode 18 by the second electrode 36 so that a weld joint surface of the tip 24 is brought into intimate contact with the tip weld site 26 of the ground electrode 18.

In the welding step, the tip 24 is resistance welded to the ground electrode 18 by the passage of electric current between the first electrode 31 and the second electrode 36.

As described above, the first side surface 21 and the distal end face 23 of the ground electrode 18 are positioned with respect to the first and second surfaces 34 and 35 of the reference member 33 that has been fixed to the flat surface 32 of the first electrode 31. In other words, the ground electrode 18 is positioned with respect to the first electrode 31. Then, the outer surface 20 of the ground electrode 18 is brought into intimate contact with the flat surface 32 of the first electrode 31. The tip 24 is arranged on the tip weld site 26 of the positioned ground electrode 18. It is therefore possible to improve the positioning accuracy of the tip 24 with respect to the ground electrode 18. As a result, variations in the inclination (i.e. contact area) and contact resistance of the tip 24 relative to the tip weld site 26 can be suppressed to prevent variations in the amount of embodiment of the tip 24 in the ground electrode 18 by resistance welding and suppress variations in the joint strength of the tip 24 to the ground electrode 18.

It is conceivable to set the tip weld site 26 into position with respect to the metal shell 16 and resistance weld the tip 24 to the tip weld site 26 of the ground electrode 18. In this case, the inclination and contact resistance of the tip 24 relative to the ground electrode 18 are easily varied due to variations in the inclination of the ground electrode 18 relative to the axis O of the metal shell 16. There consequently arise variations in the amount of embodiment of the tip 24 in the ground electrode 18, which leads to variations in the joint strength of the tip 24 to the ground electrode 18. For this reason, it is common to resistance weld the tip 24 to the ground electrode 18 after correcting the inclination of the ground electrode 18 relative to the axis O of the metal shell 16 and then positioning the ground electrode 18 with respect to the metal shell 16. However, the operation for correcting the inclination of the ground electrode 18 can cause new inclination of the ground electrode 18. When the resistance welding is performed after positioning of the ground electrode 18 with respect to the metal shell 16, the tip 24 is joined to the ground electrode 18 in an inclined manner. The joint strength of the tip 24 to the ground electrode 18 can be deteriorated by such inclination of the tip 24.

In the present embodiment, by contrast, the tip weld site 26 is set into position with respect to the ground electrode 18 (more specifically, the reference member 33 fixed to the flat surface 32 of the first electrode 31 with which the ground electrode 18 has been held in contact in the present embodiment). Thus, the operation for correcting the inclination of the ground electrode 18 relative to the axis O of the metal shell 16 can be omitted to achieve simplification of manufacturing process. As there does not occur new inclination of the ground electrode 18 by the correcting operation, it is possible to prevent deterioration in the joint strength of the tip 24 to the ground electrode 18.

In the present embodiment, the first and fourth pressing parts 41 and 44 press the ground electrode 18 against the first electrode 31 in the positioning step in the same direction as the direction in which the second electrode 36 (see FIG. 7) presses the tip 24 against the ground electrode 18 in the tip pressing step. This allows better contact between the flat surface 32 of the first electrode 31 and the outer surface 20 of the ground electrode 18. It is thus possible to effectively suppress variations in the contact resistance between the flat surface 32 of the first electrode 31 and the back surface 20 of the ground electrode 18 and then prevent or minimize variations in the joint strength of the tip 24 to the ground electrode 18.

Since the flat surface 32 of the first electrode 31 with which the outer surface 20 of the ground electrode 18 is brought into contact is made larger in area than the outer surface 20 of the ground electrode 18, the outer surface 20 of the ground electrode 18 can be stably pressed against the flat surface 32 of the first electrode 31. It is thus possible to effectively suppress variations in the contact resistance between the first electrode 31 and the ground electrode 18 and prevent or minimize variations in the joint strength of the tip 24 to the ground electrode 18.

In the supporting step before the welding step, the support member 45 supports the plug work 25 by applying the force to the insulator 11 in the same direction (i.e. Z direction) as the force exerted by the first electrode 31 onto the ground electrode 18. Namely, the plug work 25 is supported at both end sides thereof by the first electrode 31, the first pressing part 41 and the support member 45. As compared with the case where the plug work 25 is supported in a cantilever state by the first electrode 31 and the first pressing part 41, the bending load exerted on the ground electrode 18 under the own weight of the plug work 25 can be reduced so as to prevent the loads of the first and fourth pressing parts 41 and 44 from being canceled out by the bending load and to easily bring the outer surface 20 of the ground electrode 18 into contact with the flat surface 32 of the first electrode 31. It is thus possible to more effectively suppress variations in the contact resistance between the first electrode 31 and the ground electrode 18 and prevent or minimize variations in the joint strength of the tip 24 to the ground electrode 18.

Moreover, the support member 45 supports the insulator 11, which is located farther apart from the edge 32 of the first electrode 31 than the metal shell 16, so that the plug work 25 can be stably held and supported as compared with the case where the support member 45 supports the metal shell 16. This ensures intimate contact between the outer surface 20 of the ground electrode 18 and the flat surface 20 of the first electrode 31. It is thus possible to effectively suppress variations in the contact resistance between the first electrode 31 and the ground electrode 18.

Before the fourth pressing part 44 presses the ground electrode 18 toward the first electrode 31, the second and third pressing parts 42 and 43 are driven so that the ground electrode 18 is over the first electrode 31 by the second and third pressing parts 42 and 43 while being pressed toward the first electrode 31 by the first pressing part 41. This allows better contact between the flat surface 32 of the first electrode 31 and the back surface 20 of the ground electrode 18. It is thus possible to effectively suppress variations in the contact resistance between the first electrode 31 and the ground electrode 18.

Although the present invention has been described with reference to the above embodiment, it should be clearly understood that: the present invention is not limited to the above embodiment; and various changes and modifications of the above embodiment are possible without departing from the scope of the present invention.

The driving order of the pressing parts 41 to 44 in the positioning step is not particularly limited although the first pressing part 41, the second pressing part 42, the third pressing part 43 and the fourth pressing part 44 are driven in this order in the above embodiment. The driving order of the pressing parts 41 to 44 can be set as appropriate. For example, it is feasible to drive the pressing parts 41 to 44 in the following order: (1) the first pressing part 41, the third pressing part 43, the second pressing part 42 and the fourth pressing part 44; (2) the second pressing part 42, the third pressing part 43, the first pressing part 41 and the fourth pressing part 44; (3) the second pressing part 42, the first pressing part 41, the third pressing part 43 and the fourth pressing part 44; or (4) the third pressing part 43, the first pressing part 41, the second pressing part 42 and the fourth pressing part 44.

In the above embodiment, the restriction members 47 are driven to restrict elastic vibration of the support member 45 after the positioning of the ground electrode 18 by driving the pressing parts 41 to 44. The driving timing of the restriction members 47 is however not limited to such timing. The restriction members 47 can be driven at any timing after bringing the ground electrode 18 into contact with the first electrode 31 by the first pressing part 41, i.e., after fixing the position of the plug work 25 in the Z direction.

The operation for restricting elastic vibration of the support member 45 by driving the restriction members 47 is not necessarily required. As long as the ground electrode 18 is properly positioned with respect to the first electrode 31 by the pressing member (first to fourth pressing parts 41 to 44), there would not be significant influence on the quality of the resistance weld joint between the tip 24 and the ground electrode 18 even in a state where the spring 46 is vibratable.

The entire contents of Japanese Patent Application No. 2016-240173 (filed on Dec. 12, 2016) are herein incorporated by reference. The scope of the invention is defined with reference to the following claims.

DESCRIPTION OF REFERENCE NUMERALS

- 10: Spark plug
- 11: Insulator
- 16: Metal shell
- 18: Ground electrode
- 19: Inner surface
- 20: Outer surface
- 24: Tip
- 26: Tip weld site
- 31: First electrode
- 32: Flat surface (as a surface)
- 36: Second surface
- 41, 42, 43, 44: Pressing part (as a part of pressing member)

Having described the invention, the following is claimed:

1. A method for manufacturing a spark plug including an insulator, a center electrode, a metal shell a ground electrode, and a tip, the center electrode being held within the insulator, the metal shell surrounding a part of the insulator, the ground electrode being joined to the metal shell and having an inner surface facing the center electrode and an outer surface located opposite the inner surface, the tip being welded to a tip weld site on the inner surface of the ground electrode, the method comprising:

a positioning step, comprising:
  positioning the ground electrode with respect to a first electrode by bringing the outer surface of the ground electrode into contact with the first electrode, and
  actuating a first pressing part of a pressing member toward the inner surface of the ground electrode to bring the first pressing part into contact with any region of the inner surface of the ground electrode other than the tip weld site of the ground electrode so as to press the outer surface of the ground electrode against a flat surface of the first electrode, the first pressing part being disposed at a position opposed to the flat surface of the first electrode;

a tip pressing step of allowing a second electrode to press the tip against the tip weld site of the ground electrode; and a welding step of resistance welding the tip to the tip weld site of the ground electrode by the passage of electric current between the first and second electrodes, wherein, when the outer surface of the ground electrode is pressed against the flat surface of the first electrode, a force is exerted on the outer surface of the ground electrode by the flat surface of the first electrode, and a support member supports the insulator, wherein the exerted force occurs in a direction as a result of the contact of the first pressing part with the inner surface of the ground electrode, and wherein the support member is under an elastic force provided to the support member by a spring in a direction that the same as the direction in which the exerted force occurs.

2. The method for manufacturing the spark plug according to claim 1, wherein, in the positioning step, the first pressing part presses the ground electrode in the same direction as a direction in which the second electrode presses the tip in the tip pressing step.

3. The method for manufacturing the spark plug according to claim 1, wherein the flat surface of the first electrode is larger in area than the outer surface of the ground electrode.

* * * * *